United States Patent

[11] 3,592,195

[72] Inventors: Richard K. Van Wagenen
3304 S. Stanley Place, Tempe, Ariz. 85281;
Russell W. Meredith, 405 E. 10th St., Mesa, Ariz. 85201; Lee Meyerson, 6816 Almeria, Scottsdale, Ariz. 85257
[21] Appl. No. 746,640
[22] Filed July 22, 1968
[45] Patented July 13, 1972

[54] MEANS AND METHOD FOR DIURNAL TOILET TRAINING
2 Claims, 5 Drawing Figs.

[52] U.S. Cl. .................................................. 128/295, 35/29.5, 340/235
[51] Int. Cl. .................................................. A61f 5/44
[50] Field of Search .................................................. 128/1, 2, 132, 135, 138, 294, 295, 275, 386; 35/29.5; 119/95, 145; 340/279, 235; 200/61.05

[56] References Cited
UNITED STATES PATENTS

| | | | |
|---|---|---|---|
| 2,874,695 | 2/1959 | Vaniman | 128/138 |
| 3,199,095 | 8/1965 | Ashida | 340/235 |
| 3,441,019 | 4/1969 | Snyder | 128/138 |
| 3,460,123 | 8/1969 | Bass | 340/235 |

FOREIGN PATENTS

| | | | |
|---|---|---|---|
| 680,088 | 10/1952 | Great Britain | 128/138 |
| 807,115 | 6/1951 | Germany | 128/138 |
| 992,462 | 10/1951 | France | 128/295 |

Primary Examiner—Charles F. Rosenbaum
Attorney—Wm. H. Dean

ABSTRACT: A means and method for diurnal toilet training comprising a nozzle adapted to receive urine from a subject; said nozzle mounted on the subject, and having a passage in which two spaced electrodes are so disposed that urine provides an electrical bridge only when flowing through the passage; and an audio signal device coupled to the electrodes and carried by the subject; said warning device carried by the subject adapted to sound an audio signal when urination starts so as to alert the subject and a trainer in order to elicit restraint of the voiding impulse and to move to a proper toilet area, remove clothing, and take an appropriate stance for the voiding event.

PATENTED JUL 13 1971 3,592,195
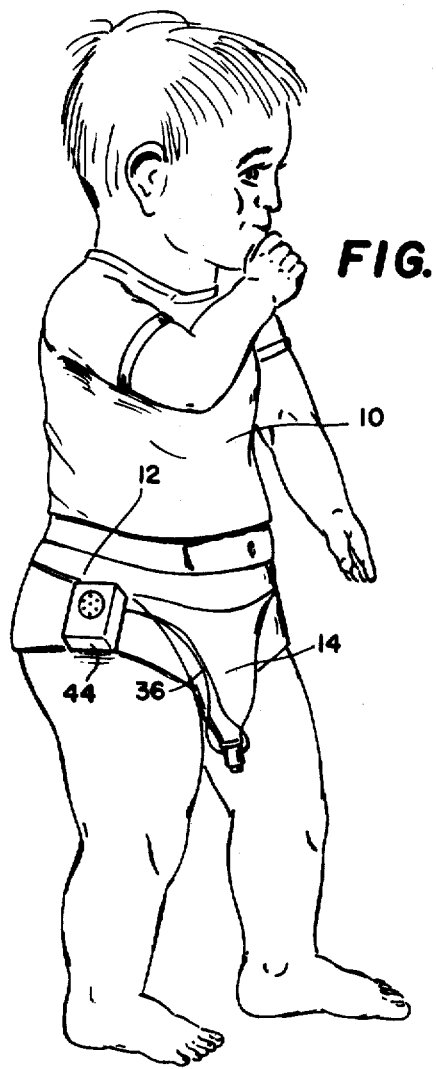
FIG.1.
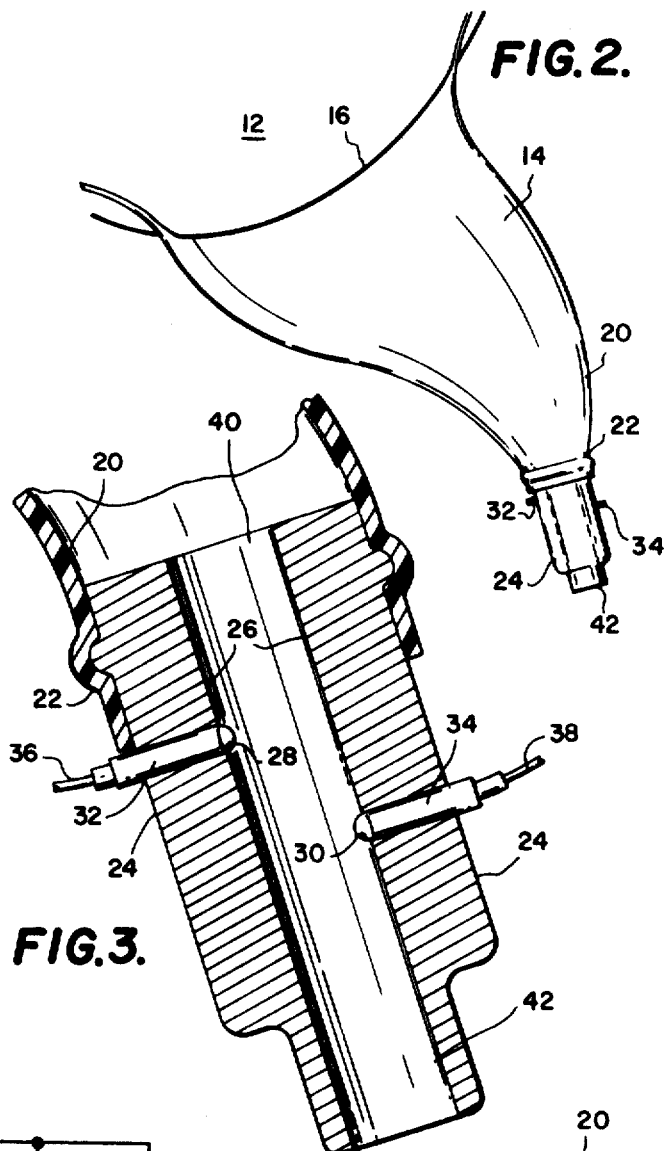
FIG.2.
FIG.3.
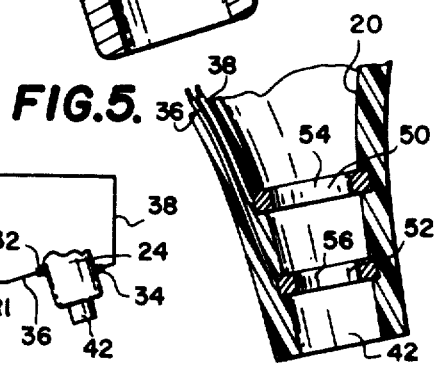
FIG.5.
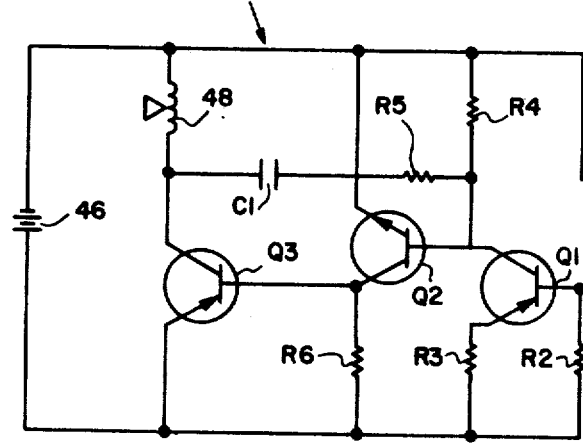
FIG.4.
INVENTOR.
RICHARD K. VAN WAGENEN
RUSSELL W. MEREDITH
BY LEE MEYERSON
*Wm. H. Dean*

MEANS AND METHOD FOR DIURNAL TOILET TRAINING

BACKGROUND OF THE INVENTION

The techniques commonly known and used in diurnal bladder training are very nearly uniform. In all western cultures, the trainer puts the child on a pot and waits for the event to occur.

An analysis of the training task suggests a reason for this technique; the terminal event is the one event of which the mother or trainer can make capital. Other aspects of the untrained child's behavior are not as readily isolated for the focus of training procedure. If the potting and waiting technique is followed for a time with some regularity and some sensitivity to the motoric activities which may be discriminated in some children when they have a need to void, one may anticipate that the frequency of voiding events at the commode will increase. The procedure is lengthy, often frustrating to the trainer and coercive to the child, and the training task is still not complete. What remains is the difficult aspect of relating the terminal event with its precursors in such a way that the child will recognize those sensations that forewarn of an impending need to void, and transport himself to the toilet facility without prompts from the trainer. The problem of teaching the child to anticipate, to walk in, and to void eventually may be managed as the mother learns to detect subtle cues as those provided when a child becomes unusually quiet or the facial expressions are ominous. When these cues appear, the mother may coax or lead the child to the facility. If she is successful, she is likely to exhibit exceptional behavior which shows the extent of her pleasure. The mother's response to the correct performance of her trainee can serve two functions. First, it informs the child that his behavior is approved, and second it may have incentive value leading the child to seek its repetition.

The order of events as usually practiced under typical training procedures may be given as follows:

1. Potting the subject to control the locus of the final event.
2. Bringing about restraint of a voiding impulse at all other locations.
3. Eliciting running in response to bladder sensations.
4. Eliciting clothing removal.
5. Teaching the subject to take an appropriate final stance.

Note that the backward associations are required in this description. The final aspect of training is learned first to be followed by certain other forward moving events. Time elapsed between training element number 1 and element 5 is likely to be weeks or months.

SUMMARY OF THE INVENTION

The present invention employs a means and method particularly adapted to training in accordance with a series of forward moving events, as follows:

1. Recognition by the subject of those body sensations associated with voiding.
2. Restraint of voiding impulse.
3. Eliciting running from the subject in response to bladder sensations.
4. Eliciting clothing removal.
5. Teaching subject to take the appropriate final stance.

In this series, the passive potting procedure is replaced by a different, active focal point. Here an attempt is made to shift the attention and learning of the subject to the recognition of certain body sensations associated with the voiding reflex. Before the learner can utilize these visceral changes as stimuli to direct his behavior, such sensations must be associated, through training, with other contemporary events and with subsequent toilet behaviors.

Two aspects of control over a bladder-emptying reflex deserve particular mention. When the focus of training is the voiding reflex occuring at locations outside the toilet facility, a child is required to learn to constrict the urinary sphincter or "turn off" the flow of urine, but he must also learn to relax the urinary sphincter and "turn on" the flow when he reaches the commode. The "turn off"-"turn on" control functions should be practiced in a sequence separated by only 3 or 4 seconds so as to be in concert with the trainer's immediate purpose—"don't do it here, do it over there." In this way it is also likely that sensations relating to the cessation of flow and its almost immediate reinitiation will provide the learner with favorable conditions for practicing the valve control.

Lovibond (1964, p. 22—24) has discussed the research of the urologist Muellner (1960, 61) which concerns the development of voluntary control of micturition. In this work Muellner after completing more than a thousand fluoroscopic studies of maternally trained children, concluded that voluntary control was gradually acquired and did not represent the adult capacity for control until about age six. The aspect of learning to initiate the flow of urine is dependent upon favorable conditions for such learning. Lovibond comments that there is "the common observation that young children will declare themselves unable to urinate whilst kept on a pot over long periods, only to void spontaneously almost immediately after being released." It seems reasonable that the learning to initiate urination voluntarily could be best learned at those times when the physiological functions are in a state of readiness (i.e., when involuntary reflex voiding occurs) and in contiguous temporal relationship to environmental events designed to bring them under voluntary control. Such is in harmony with the training scheme proposed here. That is, training efforts center around the act of involuntary voiding (in such a way as to facilitate acquisition of voluntary control).

Accordingly, it is an object of the present invention to provide a novel means for diurnal toilet training of children.

Another object of the invention is to provide a novel method for diurnal toilet training of children.

A further object of the invention is to provides a means and method which promotes a series of forward moving events which may very quickly succeed in diurnal toilet training of children.

It is an additional object of the present invention to provide a means and method for diurnal toilet training of children which is psychologically desirable.

Further objects and advantages of the present invention may be apparent from the following specification, appended claims, and accompanying drawings:

BRIEF DESCRIPTION OF THE DRAWINGS

FIG. 1 is a perspective view of the means of the invention shown worn by a child being trained;

FIG. 2 is an enlarged fragmentary elevational view of a part of the means of the invention, including a urine receiving funnel and a flow sensor connected therewith;

FIG. 3 is an enlarged fragmentary sectional view of the flow sensor of the invention;

FIG. 4 is a diagrammatic view of the electronic circuitry in connection with the flow sensor of the invention; and FIG. 5 is a view similar to FIG. 3, and illustrates a modification of the structure shown in FIG. 3.

DESCRIPTION OF THE PREFERRED EMBODIMENTS

As shown in FIG. 1 of the drawings, a child 10 may wear pants 12 which support the means of the invention. The means of the invention comprises a urine receiving funnel 14 adapted to be suspended by the pants 12 at the frontal portion of a child so as to receive the flow of urine in the area of the genitals. The funnel 14 is preferably of soft-rubberlike material and is secured to the frontal portion of the pants 12.

A lower portion 20 of the funnel 14 is provided with a resilient neck portion 22 which surrounds a cylindrical flow sensor housing 24. The portion 22 is sealingly and frictionally engaged on the peripheral portion of the housing 24, as shown best in FIG. 3 of the drawings. The housing 24 is provided with a bore 26 which serves as a urine passage. This bore 26 is of a diameter which will be substantially filled by the flow of urine from the child in order to provide a conducting bridge between ends 28 and 30 of electrodes 32 and 34 which project through the sidewall of the housing 24. Coupled to these electrodes 34 are conductors 36 and 38 which are in connection with electronic audio alarm circuit, as will be hereinafter described in detail.

The bore 26 is provided with an upper open end 40 adapted to receive urine from the flexible funnel 20 and also provided with an open lower end 42 adapted to be directed into a toilet or the like, for disposing of the urine which may flow through the bore 26, as will be hereinafter described in detail.

The conductors 36 and 38 are connected to an electronic alarm device 44 which is carried by the belt 12 so that the conductors 36 and 38 may be short and flexible for convenience in maintaining connection with the electrodes 32 and 34.

In the modification, as shown in FIG. 5, the lower portion 20 of the funnel 14 may be molded around a pair of ring-shaped electrodes 50 and 52 which are connected respectively to the hereinbefore described conductors 36 and 38, respectively. The conductors are molded in the wall of the funnel portion 20, as shown in FIG. 5, and the ring-shaped electrodes 50 and 52 are provided with respective bore portions 54 and 56 through which urine may flow.

The bridge of urine between the ring-shaped electrodes 50 and 52 depends upon gravity, and when urine is continuously bridged between these electrodes, the invention will operate in a manner similar to the operation of the electrodes 32 and 34.

It will be seen that the structure shown in FIG. 3 and the structure shown in FIG. 5 both depend upon gravity separation of the urine from a space between the respective electrodes connected with the conductors 36 and 38, respectively.

The flow sensing device of the invention sounds an alarm during urination. Since it is worn by a child trainee while he is moving freely about the environment, the sound source emanates from the child wherever he happens to be. Its purpose is to provide a discriminative stimulus for the trainee and to alert the trainer to carry out his training sequence.

The device, as hereinbefore described, has three major components, a urine collecting element, an exit orifice with sensing electrodes, and the electronic signal package. In place of underpants, a trainee will wear a urinal (FIG. 1) or urinal pant combination, which has the funnel-shaped cup 14 extending through the crotch. This is the urine collecting element which directs the flow of urine to the existing orifice 42. Disposal of urine may be accomplished by use of a separable leg bag, or it may be allowed to fall to the floor. Actually, the stimulus effects of the latter case has certain advantages for learning. The orifice is of rigid nonconducting material with two electrodes molded in. These electrodes connect to the electronic package which consists of a two transistor audio oscillator driving a small PM speaker and an electronic switch which uses one transistor. The package also contains a battery which supplies sensing signal power and drives the audio oscillator when triggered.

The electronic circuitry 44 used in conjunction with the flow sensing toilet trainer of the invention consists of a relayless electronic transistor switch and an oscillator which drives a permanent magnet speaker at a frequency determined by the oscillator timing components.

In this circuit, all three transistors are biased in their off state. Assuming no signal (dry sensing electrodes 32 and 34 with no liquid bridge across them) the only current flowing from the battery through the load is the normal leakage currents of the three transistors. This amounts to only a few microamperes. Batteries can sustain such a light current drain for many months before becoming exhausted. Because of the light battery drain no on-off switch is required using this circuit.

The circuit operation is as follows:

When the child wearing the flow sensing device urinates, a liquid bridge is formed across the sensing electrodes 32 and 34 as urine flows through the bore 26. Resistance between the electrodes 32 and 34 is on rings 50 and 52 reduced from near infinity to a value of from several hundred to several thousand ohms, depending on the salts in the urine. The bridge permits a current path from the negative terminal of a battery 46 through the urine, R1 and R2 and back to the battery positive terminal. This current flow through R1 and R2 changes the bias on Q1, a high gain, a lower power, silicon-PNP-transistor, causing Q1 to conduct. When Q1 conducts a current path exists through R3, Q1, and R4. This path allows C1 to charge and also causes Q2 to conduct. Conduct of current through Q2 will occur until C1 has charged sufficiently to cut Q2 off. Each time Q2 conducts Q3 conducts allowing a ragged square wave to flow through the speaker void coil. A discharge path is provided by Q3 for C1, thus setting the stage for another oscillation. The square wave to the speaker is rich in harmonics and the speaker emits a loud rich tone. Frequency of oscillation is determined by C1, R5, R4 and supply voltage. The novel portion of this circuit is the switch on the input Q1.

A summary of the prior art method and that of the invention for diurnal toilet training is as follows:

POTTING PROCEDURE-PRIOR ART

1. Child is potted as a first training step and approved for an event at the commode. Effort is to teach him to void, whether the bladder is ready or not.
2. Voiding at inappropriate locations is capriciously detected, disapproved. High vigilance is required of the trainer.
3. First learning is that of releasing urine for approval.
4. Elements of the learning task are practiced and acquired one at a time over a period of weeks—months. Trials are relatively inconsistent.
5. Training trails are quite different from the behavior the child will exhibit when the training is complete.

FORWARD MOVING PROCEDURE-INVENTION

1. Child is given environmental training signals (discriminative stimuli) in association with a full bladder, the voiding sensations, and quick movement to the toilet facility. The child is physiologically ready.
2. Voiding at inappropriate locations is the focus of training—always detected, disapproved. Modest amount of vigilance is required of the trainer.
3. First learning is termination of urination. This is immediately followed by learning to release urine at the commode.
4. Elements of learning except those of clothing removal are acquired at once and all practiced together within a few seconds on every trial.
5. Training trials closely approximate the final behavior expected of the child.

NATURE OF THE FORWARD MOVING PROCEDURE

1. Instrumentation. A unique aspect of the method of the invention is the manner in which the trainer is able immediately to detect an elimination and act upon it. Each trainee is equipped with an electronic signal generator capable of detecting a slight flow of urine and reporting it instantly as the voiding response begins. When the flow stops, the signal also terminates. The fact that the signal parallels the flow of urine allows the trainer to intervene to influence the trainee in the initiation and termination of urine flow. The signal generator is a battery-powered oscillator driving a small speaker which provides a clear tone. The instrument package (2 inches ×3⅛ inches ×1⅛ inches) is connected to electrodes inserted into the terminal orifice of a rubber or plastic urinal and emits its signal when urine crosses the grid.

Numerous modifications in the device evaluated by successive field trials, have been made over a period of 4 years and it now appears to be a compact, highly reliable and effective apparatus. The signal package and its accessories are worn on the trainee as shown in FIG. 1.

2. Temporal relationship of signal to the onset of urination. Design of the signal generator is such that the first drop or two of urine will activate the signal. This means that the operation of the sphincter releasing mechanism is followed almost immediately by the auditory signal. An adequate theoretical account of the process by which a child comes to inhibit the voiding reflex when the signal does not operate as a forewarning, but actually follows opening by the sphincter muscle is presently lacking, but there is no doubt that the learning occurs.

Inhibition of the micturition reflex in the case of nocturnal enuresis has been accomplished even in the state of sleep by an apparent backward conditioning procedure (Mowrer, 1938). Pilot work with the signal generator also confirms that in practice learning to inhibit the urinary flow does occur. It should be born in mind that the auditory signal and the constriction of the urinary sphincter are very close temporal events.

3. Significance of the behaviors of the trainer and trainee. The temporal locus of training efforts is at the onset of the auditory signal. Knowing that an elimination is in progress, it is the first concern of the trainer to accomplish termination of the urine flow. Upon hearing the signal the trainer will make a noisy and rapid approach to the trainee, grasp him by the hand and move him quickly to the commode. This has the purpose of startling the child so that the voiding reflex may be stopped. There is, in this behavior of the trainer, the merit that it supports the recognition by the trainee of whatever somatic events are prominent at the time and links these events with rapid movement to the toilet facility. The forward moving sequence of events requires only three or four seconds.

Inasmuch as a training trial does not occur until voiding begins it is desirable to facilitate the accumulation of fluid in the child's bladder. Accordingly, at frequent intervals the trainee will be encouraged to consume as much water as he will drink. Density of training trails will be increased in this way. Training under the forward moving procedure is intensive rather than extensive as in the case of the potting procedure. With the ease of the discriminations the forward moving procedure requires and the high frequence of training trails independent toilet habits are acquired quickly.

It will be obvious to those skilled in the art that various modifications of the present invention may be resorted to in a manner limited only by a just interpretation of the following claims.

We claim:

1. In a means for remediation of diurnal enuresis, which means are effective to provide an audio alarm signal substantially immediately responsive to the flow of urine from a human subject, said audio signal being initiated at the onset of the flow of said urine,
continued during said flow, and
terminated at the cessation of the said flow, which means comprise, in combination:
 a. a funnel adapted to be continuously supported and worn by a human subject to receive any urine issuing from the urethral orifice of said subject;
 b. an electrode housing having a bore therethrough communicating with said funnel;
 c. a pair of electrodes spaced within said bore and functioning as an electrical switch when bridged by said urine at the onset of the flow thereof, to continuously close an electronic circuit during the continuance of said flow and to open said electronic circuit at the cessation of said flow; and
 d. an electronic circuit including alarm means, said circuit being responsive to the functioning of said spaced electrodes as set forth in paragraph (c) hereof.

2. A method for the instructional remediation of diurnal enuresis in a human subject comprising the steps of:
 a. informing said subject of the onset of flow or urine from said subjet's urethral orifice;
 b. continuing said information during the continuance of said flow;
 c. terminating said information upon the cessation of said flow; and
 d. repeating steps (a) through (c) until said subject is conditioned to recognize the sensations associated with the conditions of having a full bladder, urinating and terminating the urination
 e. instructing said subject to make use of regular toilet facilities when said subject recognizes the sensations associated with having a full bladder.